June 19, 1956  U. SASSI  2,750,659
MACHINE FOR THE AUTOMATIC FORMING OF THE LAMINATED IRON
CORE OF TRANSFORMERS, INDUCTION COILS, AND THE LIKE
Filed July 6, 1950  4 Sheets-Sheet 3
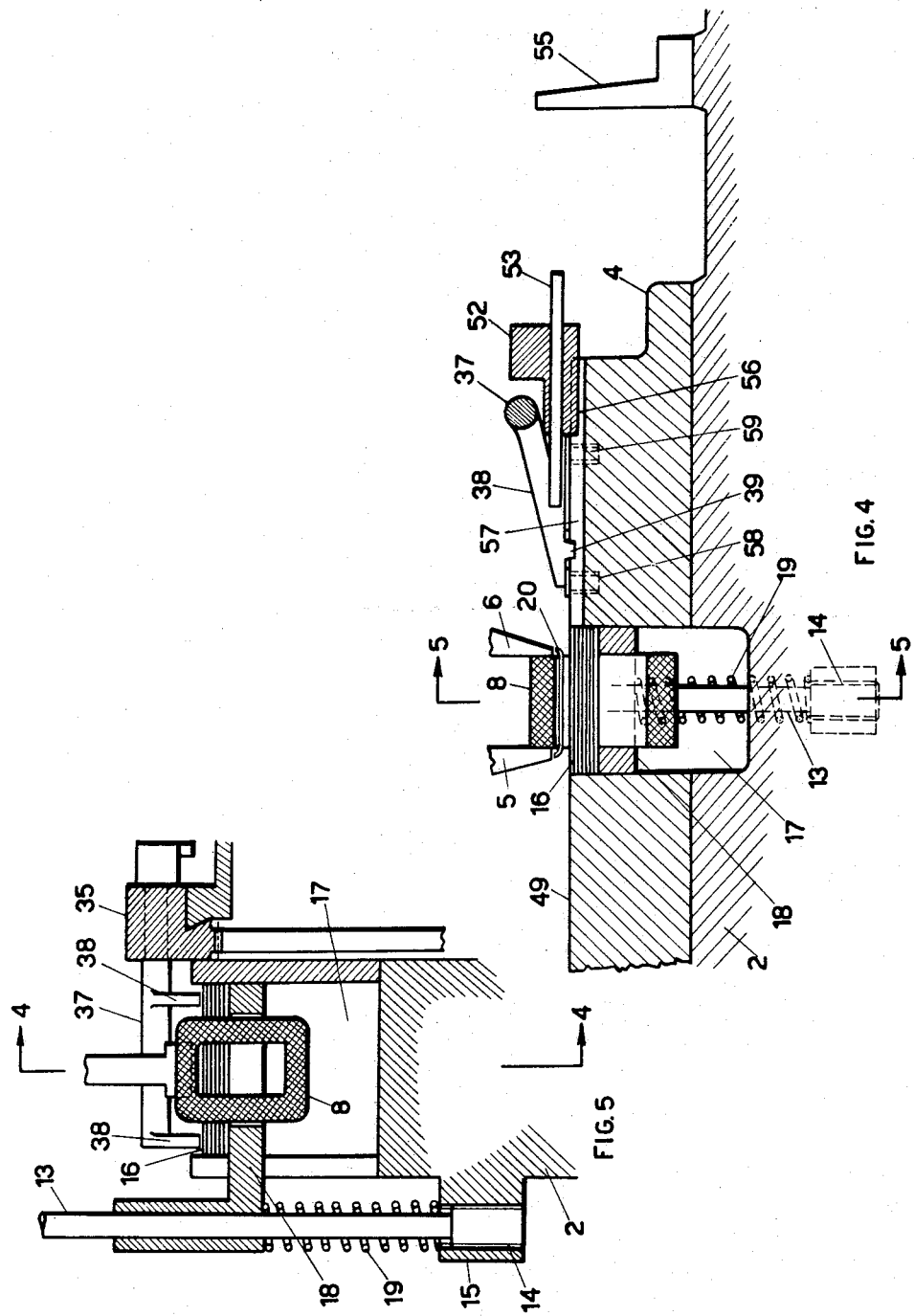
Inventor
Umberto Sassi
Scrivener and Parker
Attorneys

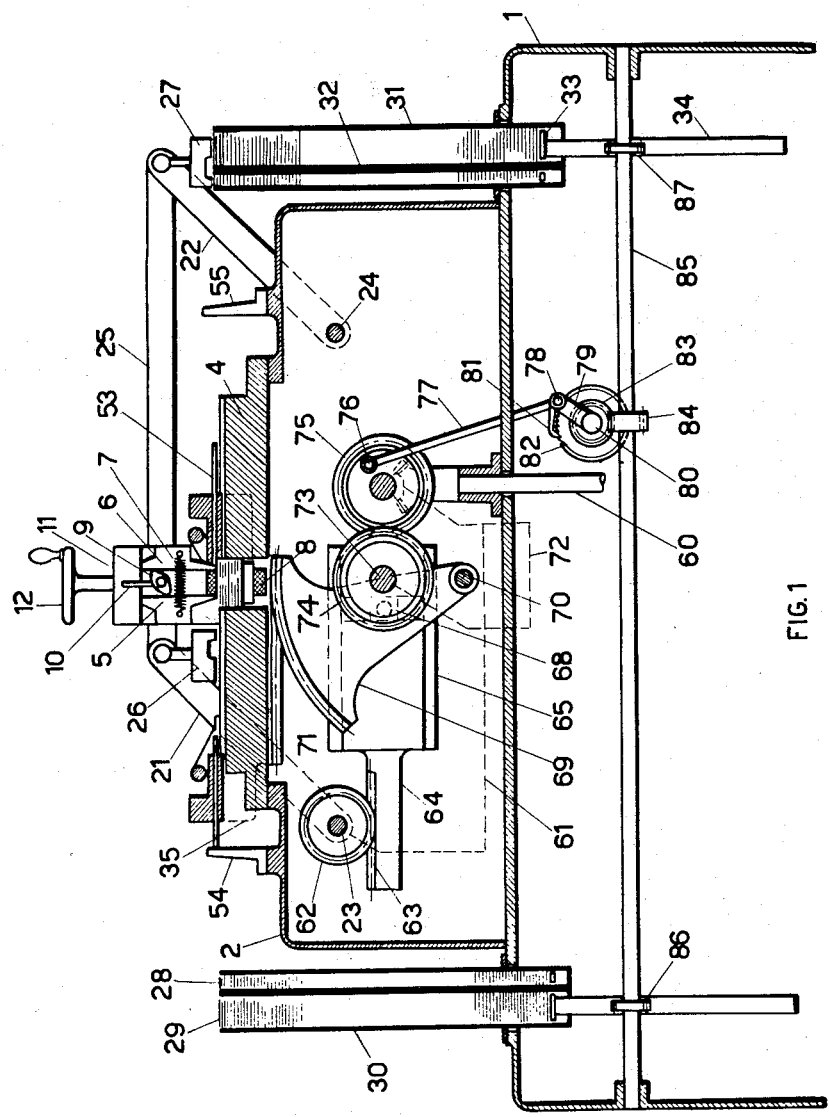

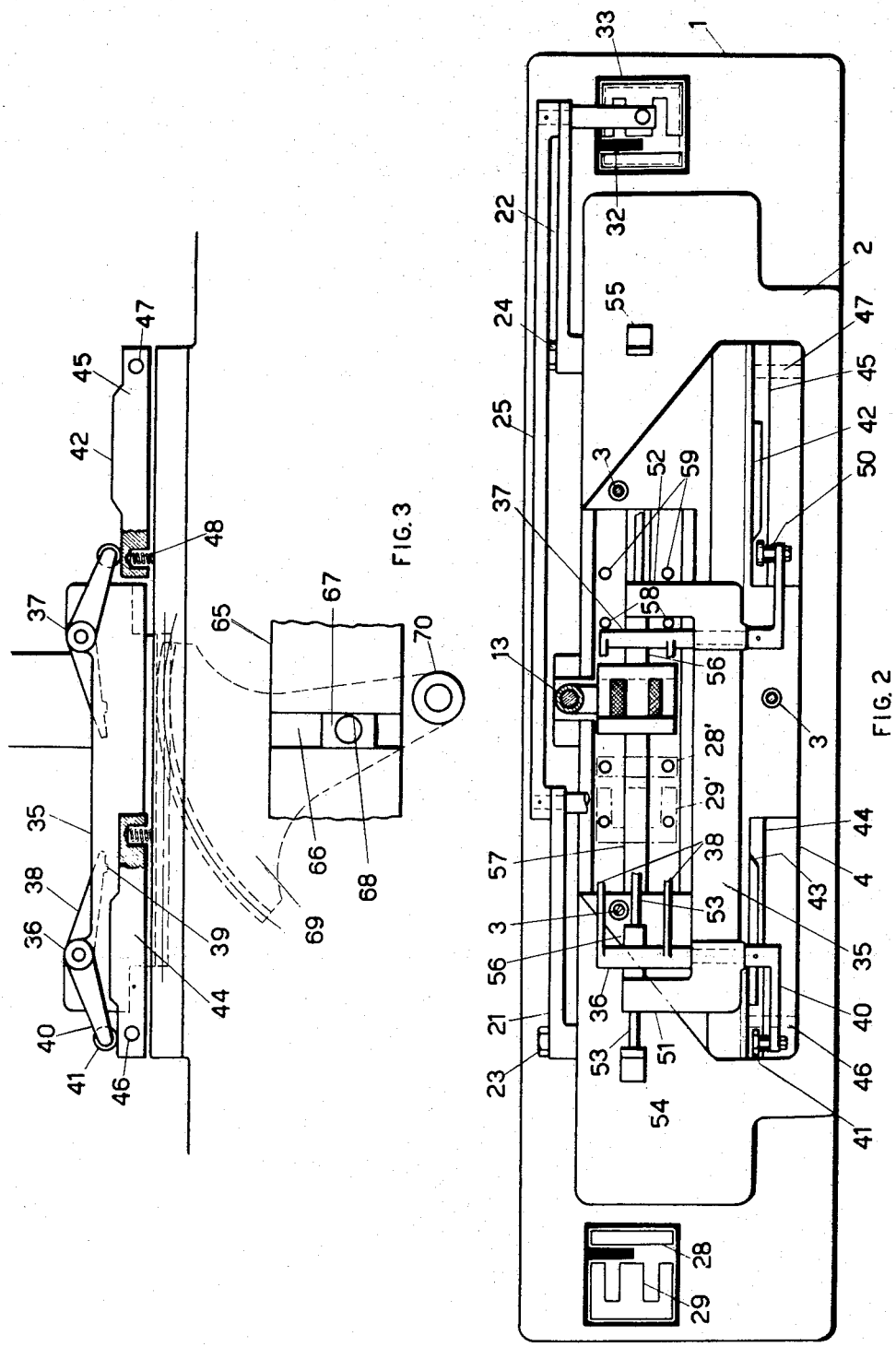

United States Patent Office 2,750,659
Patented June 19, 1956

2,750,659

MACHINE FOR THE AUTOMATIC FORMING OF THE LAMINATED IRON CORE OF TRANSFORMERS, INDUCTION COILS, AND THE LIKE

Umberto Sassi, Milan, Italy

Application July 6, 1950, Serial No. 172,336

5 Claims. (Cl. 29—203)

The present invention relates to a machine for the automatic forming of laminated iron cores of transformers, induction coils and the like.

The method of preparing the laminated core according to the present invention essentially consists in previously accommodating a pilot lamination within the winding, in locking the winding and in introducing then automatically the laminations thereinto by making them slide on the pilot lamination, in such a manner that each lamination being introduced acts as a wedge between the pilot lamination and the core laminations already interleaved in the winding, this operation being carried on until the core is completed.

The method of automatic forming of the laminated iron core according to the present invention is particularly suited for laminated iron cores constituted of I- and E-shaped laminations, wherein the E-shapes are arranged alternately crosswise.

Both operations of introducing the laminations and feeding said laminations are performed by a machine in a completely automatic manner. Said machine comprises in its essential parts a device for locking the winding, a guiding device and a device for supporting the laminations introduced into the winding, which presses said laminations yieldingly against the pilot lamination, a mechanism for feeding the laminations and for previously arranging them in a position suited for introducing them into the winding, and a mechanism for introducing the laminations into the winding.

According to one characteristic of the invention, the mechanism for feeding and previously arranging the laminations comprises a number of conveying magnets, which pick up the laminations from a stock and lay them down upon a work bench as well as a number of fixed magnets provided on the bench and stronger than the conveying magnets, which detach the laminations from the conveying magnets to keep them on the bench.

According to a further characteristic of the invention the machine is universal, that is to say it serves for laminations of any size and to this end it comprises a removable block that can be easily replaced if change-over is to be effected from a type of lamination to another of different size.

These and other characteristics of the invention will be made more fully clear by the following description merely by way of example and not by way of limitation, of one form of embodiment of the invention, with reference to the accompanying drawings, where:

Fig. 1 is a front view partly in section of a machine according to the present invention;

Fig. 2 is a plan view on enlarged scale, of the machine of Fig. 1, with some parts omitted or broken for the sake of simplicity;

Fig. 3 is a front view partly in section, on the same scale as Fig. 2, of a detail of the machine of Fig. 1;

Fig. 4 is a section, on further enlarged scale with respect to Figures 2 and 3 along the line 4—4 of Fig. 5, showing a detail of the machine of Fig. 1;

Fig. 5 is a section along the line 5—5 of Fig. 4;

Figure 6:
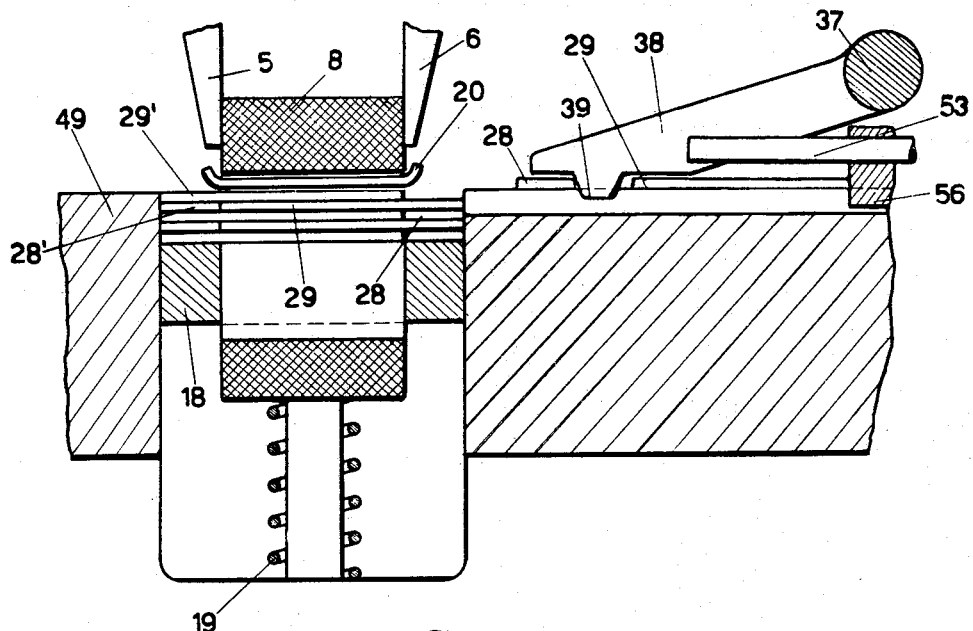
Fig. 6 is a section similar to Fig. 4 showing the position of the parts when an I-shaped lamination is being fed toward the winding.
Figure 7:
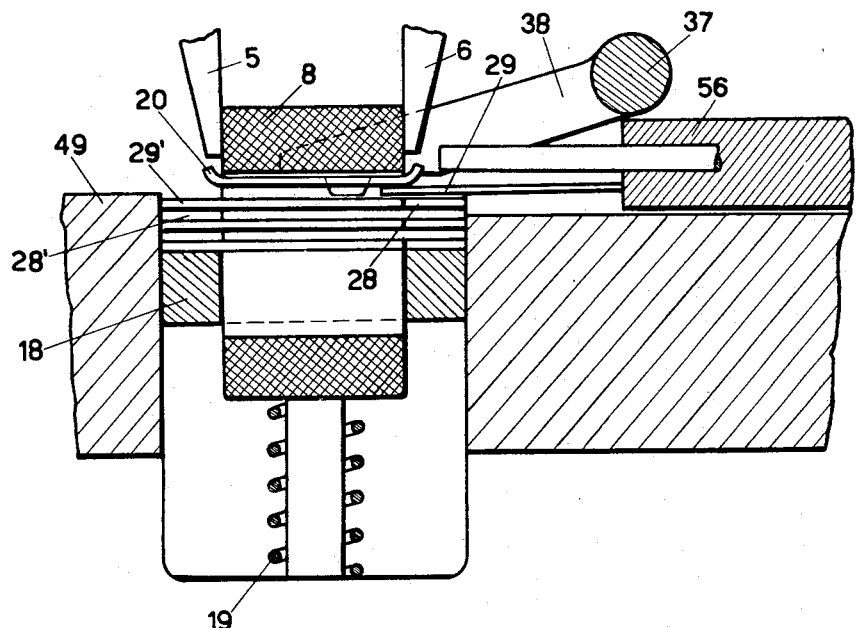
Fig. 7 is a section similar to Fig. 4 showing the position of the parts when an E-shaped lamination is being introduced into the winding.

For simplicity, in the various figures, those parts of the machine have been omitted as are not bearing on the present invention.

With reference to Figures 1 and 2, on a base 1 there is mounted a structure 2, on which a block 4 is fixed by means of screws 3. The block 4 constitutes the part of the machine that is replaced if changing over to a lamination of a different size. The device for locking the winding comprises a vise constituted by two jaws 5, 6 which is closed under the action of a spring 7 to grip the winding 8 to be cored between them (see also Fig. 4) and susceptible of being opened by a cam 9 actuated by means of a lever 10 so as to enable the winding to be extracted after building up the core. The jaws are mounted on a head 11, which can be lifted or lowered with the aid of a handwheel 12 the spindle 13 of which is screwed in at its lower end into a threaded hole 14 provided in a bracket 15 of the structure 2 (see Figures 4 and 5).

The device for guiding the laminations 16 introduced into the winding, is constituted by the vertical walls of a cavity 17 existing in the block 4, which extends over a certain depth into the structure 2. The device for supporting the laminations is constituted by a cross-beam 18 guided in the spindle 13 and pushed by a spring 19 constantly upward so as to press the laminations 16 against the pilot lamination 20 (see Figures 4 and 5).

The mechanism for feeding and previously arranging the laminations comprises an articulated parallelogram constituted by the parallel arms 21, 22 pivoted on the structure 2 at 23 and 24 respectively and connected at the other end by a rod 25 (Figures 1 and 2). At these ends, two magnets 26, 27 hang from the arms. The magnets 26, 27 are in reality constituted each by two magnets apt to pick up respectively I-shaped laminations 28 and E-shaped laminations 29 from two stocks 30, 31 accommodated on the base at opposed sides of the machine. Each stock comprises one compartment for the I-shapes and one for the E-shapes, divided by a partition 32 that does not cross the whole stock in order to leave a free passage for a single supporting plate 33 mounted upon a stem 34, which supports the pile of laminations from below.

The mechanism for introducing the laminations comprises a slider 35 (see Fig. 3) endowed with a reciprocating movement and carrying two rockers 36, 37 pivoted at their ends and having two parallel arms 38 provided with a pick-up tooth 39 and an arm 40 orientated in the opposed sense and carrying at its free end a roll 41 apt to cooperate with a cam profile 42 having lateral chamfer 43 at its part looking toward the middle line of the machine.

The cam profile 42 is carried by each of two arms 44, 45 pivoted on the block 4 at 46 and at 47 respectively and pushed upward by a spring 48 against the action of the roll 41, which acts to keep them down owing to the stop of the arms 38 against the slide bench 49. The roll 41 is mounted to be movable by axial translatory movement against the action of a spring 50 that acts to keep it in engagement with the cam profile 42. The slider 35 has at its ends two arms 51, 52 projecting toward the slide bench and each carrying in correspondence with the longitudinal axis of the bench each a rod 53 arranged parallel to the bench at a short distance thereabove and free to displace axially in its seat, designed to prevent any possible crooking of the E-shaped laminations during their sliding on the bench. Two stops 54, 55 serve to return the rods to their initial position during the return stroke of the arms. The arms 51, 52 have each an extension 56 guided in a longitudinal groove 57 provided in the slide bench 49, while also the small teeth 39 of the arms 38 slide in grooves provided to this end in the bench 49 and not represented for simplicity. In the bench 49 there are mounted and embedded therein at each side of the middle line of the machine two pairs of magnets 58 and 59, the former for detaching the I-shapes and the latter for detaching the E-shapes, the attraction power of said magnets being higher than the power of the magnets 26, 27, so as to be able to detach the laminations therefrom as the laminations are brought into registry with the former.

The drives of the various devices described are established in the following way:

The drive shaft 60 of the machine transmits movement by way of a mechanical transmission diagrammatically indicated by the dotted line 61, to the shaft 23 which controls the movement of the articulated parallelogram 21—22—25. Drive shaft 60 is periodically reversed in its rotation by any known sequentially reversing drive means, such as a crank arrangement (not shown), to impart oscillatory or reciprocatory motion to the mechanism driven thereby and described herein. On the shaft 23 there is fitted a toothed wheel 62 engaging with a rack 63 provided on an extension 64 of a slide 65. In said slide there is provided a slit 66 (see Fig. 3) wherein there is arranged a skid 67 carrying a pin 68 engaging with a corresponding hole existing in a toothed sector 69. It will thus be seen that as the slide member 64 is reciprocated through the periodically reversed rotation of gear 62, the pin 68 imparts an oscillatory movement to sector 69, the skid 67 enabling the pin 68 to partake of a slight reciprocatory motion as the sector 69 oscillates about its pivot 70. The sector 69 engages with the rack 71 of the slider 35 to impart thereto the afore-described reciprocation.

The shaft 60 also transmits movement by way of a mechanical transmission diagrammatically indicated by the dotted line 72, to a shaft 73 whereon there is fitted a toothed wheel 74 engaging with a toothed wheel 75 carrying a crankpin 76. To the latter is articulated a connecting rod 77, which at its other end is articulated at 78 to a crank arm 79 pivoted at 80. At the point 78 there is also articulated a pawl 81 adapted to cooperate with the toothing of a wheel 82 coaxial to the pin 80 and rigidly connected with a worm wheel 83 engaging with another worm wheel 84. The latter is mounted on a shaft 85 which passes through the machine in its whole width and whereon are fitted two toothed wheels 86, 87 each engaging with a rack, not represented for simplicity, but existing on each of the two stems 34.

Operation of the machine described is as follows:

The winding 8, inside which the laminated iron core is to be built up, is previously arranged for the operation by introducing by hand a lamination 20 thereinto. The lamination 20 is bordered so as to constitute a pilot aid for introducing the laminations from both sides. Said lamination may be constituted for instance by the central arm of an E-shaped lamination suitably cut. Then the winding is locked between the jaws 5 and 6 by acting upon the lever 10 and the whole assembly is lowered by means of the handwheel 12 until the pilot lamination is substantially at the height of the slide bench 49. The receivers 30 and 31 are filled with I-shaped and E-shaped laminations.

On starting the machine, the slider 35 begins performing its to and fro motion synchronized with the motion of the articulated parallelogram 21—22—25. With the various mechanisms in the position of Figures 1 and 2, it can be seen that the movements of the slider and of the articulated parallelogram are timed with respect to one another in such a manner that if the magnets 27 are facing the respective stock receiver 31, the rocker 36 that is at the opposed side with respect to the middle line of the machine is completely displaced outward and is ready to start the operation of introducing the I- and E-laminations 28' and 29' respectively into the winding (see Fig. 2), the laminations 28' and 29' being those deposited on the bench 49. At this time, the arm 22 starts its rotation leftward to convey one I-lamination and one E-lamination picked up from the stock 31 and attached to the magnets 27. At the same time, the slider 35 starts displacing rightward and in this movement the small roll 41 meets the cam profile 42 and is lifted thus causing descent of the arms 38 of the rocker 36, which begin sliding on the bench 49. During that movement, the teeth 39 of the arms come to engage with the I-laminations, while the front wall of the extension 56 comes to engage with the E-laminations. While the movement continues, therefore, the I- and E-laminations are dragged toward the winding. During the same interval of time, the small roll 41 of the rocker 37 meets the incline 43 of the respective cam 42 and is pushed toward the outside of the machine against the reaction of the spring 50 to the side of the said cam to continue its travel in a lowered position, so that the arms 38 of the rocker 37 are raised with respect to the bench 49. When the I-lamination meets the front wall of the winding 8, it stops and then the E-lamination that follows it climbs over it until it stops at the mechanically predetermined position. During the whole stroke, the rod 53 has prevented the E-lamination from bending for any reason by rising over the bench 49. In the meantime, the arm 37 has returned back and little before the end of the stroke the rod 53 mounted therein has hit against the respective stop 55, thus returning to the working position. At the same time, the arm 22 has gone into its other extreme position with respect to the position represented in the drawing, in which it has deposited the I- and E-laminations attached to the magnets 27, onto the bench 49 respectively in register with the magnets 58 and 59, while the arm 21 has reached its extreme position, in which the respective magnets 26 are facing the mouth of the stock receiver 30.

At this time, movement of the various gearings starts in the reversed sense. The magnets 27 rise and the laminations of I- and E-shape deposited by them are held on the slide bench 49 by the greater attraction exerted thereupon by the magnets 58 and 59 as compared to the magnets 27. It should be noted that the E-lamination is orientated on the bench 49 in a position reversed with respect to the E-lamination introduced from the opposed side of the bench in the preceding operation hereinbefore described. The rocker 37 together with the extension 52 of the slider 35 now pushes said laminations into the winding, while the rocker 36 goes back being lifted over the bench owing to the lateral slide outward of the roll 50 on the chamfer 43 of its respective cam 42. In the same interval of time, the arm 21 carries by means of the magnets 26 one I-lamination and one E-lamination from the stock receiver 30 onto the bench 49, while the arm 22 carries the magnets 27 into the position facing the stock receiver 31. The cycle of the machine is completed and may thereafter be repeated indefinitely.

Simultaneously with the movement of the magnets and of the rockers there takes place the advancement of the laminations in the two stock receivers. In fact, during each turn of the toothed wheel 75, the pin 78 performs a relative movement with respect to the toothed wheel 82, during which the pawl hops over the profiles of the teeth of said wheel and successively returns back dragging the wheel 82 along with it by a certain angle owing to the engagement of the pawl 81 with the steep section of the teeth of said wheel.

The movement of the wheel is transmitted by way of the coupling 83—84—85 to the toothed wheel 86 or 87, thereby advancing the piles of laminations 30 or 31 as explained above. When the laminated core is completely built up, the jaws 5, 6 are lifted by means of the hand-wheel 12 and opened by the lever 10 so as to enable the winding to be extracted.

The machine according to the invention offers the great advantage that it can be utilized for laminations of various sizes. If a laminated core of different dimensions is to be formed, the screws 3 are unscrewed and the whole block 4 is removed and replaced with a new one, designed for the new lamination size. Of course, it will be also necessary to replace the stock receivers 30 and 31. If the new laminations are of different thickness, the advancement of the laminations in the stock receivers must be adjusted, which is obtained by regulating in any known manner the position of the crankpin 76 and thus the arc by which the pawl 82 drags the wheel 83 at each turn.

While only one embodiment of the present invention has been described, it is obvious that various other embodiments and modifications are possible without departing from the scope of the invention as defined by the appended claims.

I claim:

1. A machine for the automatic assembling of the laminated iron cores of transformers, induction coils and the like, comprising a device for locking the coil with its axis horizontal in a fixed position with respect to the machine, provided in register with the middle line of said machine, a pilot lamination for guiding and a device for supporting the laminations pushed into said coil, said latter device resiliently pressing said laminations against the pilot lamination applied in said coil against the top surface of the coil window and being adapted to move perpendicular to the coil axis as said laminations are individually pushed into said coil, two tubular magazines each containing a pile of I laminations and a pile of E laminations and arranged at opposite sides of said locking device, with the legs of said E laminations projecting towards said locking device and the E lamination magazines being disposed outwardly of the I lamination magazines with respect to said locking device, a slide bench extending at the two sides of said locking device, a plurality of magnets embedded in said slide bench, two parallel arms arranged at each side of said locking device and carrying a magnet, means for synchronously moving said arms from the position in which their magnets face the mouth of the respective magazines to the position facing said magnets in said slide bench, the latter magnets having an attracting force greater than the attracting force of said magnets carried by said arms, and a slider effecting a reciprocating motion parallel to said slide bench and having at each side of said locking device means for pushing said laminations into said coil along said slide bench, the motion of said slider being synchronized with the motion of said arms and timed relative thereto in such a manner that to a movement of said slider in one direction corresponds a movement of said arms in the opposite direction.

2. A machine for the automatic assembling of the laminated iron cores of transformers, induction coils and the like, comprising a device for locking the coil with its axis horizontal in a fixed position with respect to the machine, a well disposed beneath said locking device and having walls adapted to guide the laminations already pushed in said coil, a cross-beam in said well on which said laminations rest, resilient means to urge said cross-beam upwards so as to press said laminations against a pilot lamination applied in said coil against the top surface of the coil window, two tubular magazines each containing a pile of I laminations and a pile of E laminations and arranged at opposite sides of said locking device, with the legs of said E laminations projecting towards said locking device and the E lamination magazines being disposed outwardly of said I lamination magazines with respect to said locking device, a slide bench extending at the two sides of said locking device, a plurality of magnets embedded in said slide bench, two parallel arms arranged at each side of said locking device and pivoted at one end and carrying at their other end a magnet, a link connecting said arms to effect a synchronized oscillating motion thereof about their pivots from a position in which said magnet carried by them faces the mouth of the respective magazine to the position facing said magnets in said bench, and a slider effecting a reciprocating motion parallel to said bench and having at each side of said locking device a rocker, one arm of which is adapted to engage the laminations to be pushed into the coil under the action exerted by the opposite arm carrying a roller cooperating with a cam profile arranged parallel to said slide bench and formed in such a manner that during the stroke of pushing the laminations the roller slides on the cam profile whereby said first rocker arm is kept down on said bench in engagement with said laminations, and during the return stroke the roller disengages from the cam profile whereby said first rocker arm lifts with respect to said bench, the movement of said slider and of said parallel arms being timed relative to one another in such a manner that when the magnets of one of said arms are facing the respective magazine, the rocker at the opposite side with respect to the middle of said machine is at its outermost position and is ready to start the pushing operation into said coil of said I and E laminations which have been deposited on said slide bench from said other arm in the preceding step of the machine circle.

3. The invention as claimed in claim 2, in which said rocker arm engaging said laminations is provided with a tooth sliding in a groove provided in said bench and adapted to engage an I lamination, and said slider is provided with an extension which is guided in said groove and is adapted to engage an E lamination.

4. The invention as claimed in claim 3, in which in a part of said extension projecting upwardly from said groove a rod is mounted to be freely movable by translation in an axial direction, said rod projecting from said extension parallel to said slide bench at a very short distance thereover in such a manner as to prevent said laminations from being lifted or bent during their sliding on said bench, said rod being caused to go back relative to said extension by impact against the front face of said coil when the slider approaches the end of its stroke for pushing said laminations into said coil and being returned to its working position by impact against a stop at the end of the return stroke of said slider.

5. A machine for the automatic forming of the laminated iron cores of transformers and the like, comprising a device for locking the coil with its axis horizontal in a fixed position with respect to the machine provided in register with the middle line of said machine, a pilot lamination for guiding and a device for supporting the laminations pushed into said coil, said latter device resiliently pressing said laminations against the pilot lamination applied in said coil against the top surface of the coil window and being adapted to move perpendicular to the coil axis as said laminations are pushed into said coil, two inner and outer tubular magazines on each side of said locking device, each of said magazines respectively containing a pile of I laminations and a pile of E laminations with the legs of said E laminations projecting towards said locking device, a slide bench extending at the two sides of said locking device, means for simultaneously placing an I and E lamination from the tubes on one side of said locking device onto said slide bench and then placing on said bench an I and E lamination from the tubes on the other side of said locking device, a slider effecting a reciprocating motion parallel to said bench and having on each side of said locking device an E lamination engaging arm fixed to said slider and an I lamination engaging arm pivoted to said slider and movable between engaged and disengaged positions, means operatively connected to each of said last named arms for retaining it in normally disengaged position and for moving it to engaged position upon movement of said arms by said slider towards said locking device, the last named arm feeding into said coil an I lamination and the first-named arm feeding into the same side of said coil immediately thereafter an E lamination upon each reciprocation of said slider, the I lamination being positioned with respect to said coil in the same plane as a mating E lamination previously positioned on the opposite side of said coil by a previous movement of said slider, the I lamination and said mating E lamination providing a lower supporting and guiding surface for the E lamination being fed into said coil on the same side thereof as the last mentioned I lamination.

References Cited in the file of this patent

UNITED STATES PATENTS

| | | |
|---|---|---|
| 1,564,843 | Fulton | Dec. 8, 1925 |
| 1,876,821 | Dugan | Sept. 13, 1930 |
| 1,966,878 | Bluzat | July 17, 1934 |
| 1,985,273 | Altorfer | Dec. 25, 1934 |
| 2,203,512 | Wesemann | June 4, 1940 |
| 2,464,029 | Ehrman | Mar. 8, 1949 |
| 2,494,349 | Mittermaier | Jan. 10, 1950 |
| 2,586,320 | Ford | Feb. 19, 1952 |